United States Patent
Shigematsu et al.

(10) Patent No.: US 8,590,651 B2
(45) Date of Patent: Nov. 26, 2013

(54) INTAKE SYSTEM OF VEHICLE ENGINE INSTALLED IN ENGINE COMPARTMENT

(71) Applicant: Suzuki Motor Corporation, Shizuoka (JP)

(72) Inventors: Daigo Shigematsu, Shizuoka (JP); Akira Fukushima, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 0 days.

(21) Appl. No.: 13/675,652

(22) Filed: Nov. 13, 2012

(65) Prior Publication Data

US 2013/0146378 A1     Jun. 13, 2013

(30) Foreign Application Priority Data

Dec. 9, 2011   (JP) .................. 2011-269912

(51) Int. Cl.
  *B60K 13/02*  (2006.01)
(52) U.S. Cl.
  USPC ........................................ 180/68.1; 180/68.3
(58) Field of Classification Search
  USPC ................... 180/68.1, 68.2, 68.3, 68.4, 68.5
  See application file for complete search history.

(56) References Cited

U.S. PATENT DOCUMENTS

| | | | | |
|---|---|---|---|---|
| 2,104,772 A | * | 1/1938 | Saunders | 180/68.5 |
| 2,104,773 A | * | 1/1938 | Saunders | 180/68.5 |
| 4,896,734 A | * | 1/1990 | Horiuchi et al. | 180/68.3 |
| 4,976,327 A | * | 12/1990 | Abujudom et al. | 180/68.2 |
| 7,690,462 B2 | * | 4/2010 | Kato et al. | 180/68.3 |
| 7,758,680 B2 | * | 7/2010 | Oka et al. | 96/416 |
| 2009/0260909 A1 | * | 10/2009 | Oka et al. | 180/291 |
| 2010/0089674 A1 | * | 4/2010 | Oka et al. | 180/68.1 |
| 2010/0326756 A1 | * | 12/2010 | Landgraf et al. | 180/68.3 |
| 2011/0132678 A1 | * | 6/2011 | Nakamura et al. | 180/68.3 |

FOREIGN PATENT DOCUMENTS

| | | | | |
|---|---|---|---|---|
| JP | 03292273 A | * | 12/1991 | ............ B62D 25/10 |
| JP | 11-294279 A | | 10/1999 | |
| JP | 2002-195116 A | | 7/2002 | |

* cited by examiner

*Primary Examiner* — Paul N Dickson
*Assistant Examiner* — Bridget Avery
(74) *Attorney, Agent, or Firm* — Rothwell, Figg, Ernst & Manbeck, P.C.

(57) ABSTRACT

In an intake system of an engine of a vehicle, an intake duct includes a horizontal portion having a front end and a rear end in the front-rear direction of the vehicle and located to extend in the front-rare direction of the vehicle to be opposite to a top face of a battery, and a vertical portion extending curvedly from the front end of the horizontal portion and extending downward in a height direction of the vehicle along a front face of the battery. The vertical portion is formed with an air intake at a bottom thereof in the height direction of the vehicle. The air intake is located at a front side of the battery in the front-rear direction of the vehicle to be higher in the height direction of the vehicle than a bottom edge of the front face of the battery. An opening of the air intake is directed downward in the height direction of the vehicle.

5 Claims, 6 Drawing Sheets

INTAKE SYSTEM OF VEHICLE ENGINE INSTALLED IN ENGINE COMPARTMENT

CROSS REFERENCE TO RELATED APPLICATIONS

This application is based on and claims the benefit of priority from Japanese Patent Application 2011-269912 filed on Dec. 9, 2011, the disclosure of which is incorporated in its entirety by reference.

TECHNICAL FIELD

The present invention relates to intake systems of a vehicle engine, and more particularly to such an intake system installed in the engine compartment of a vehicle to introduce external air into an intake manifold of an engine while cleaning it.

BACKGROUND

In the engine compartment of a vehicle, a battery, an intake system, and other objects are disposed in addition to an engine. There are two arrangement examples of these objects in the engine compartment of a vehicle.

The first arrangement example is disclosed in Japanese Patent Application Publication No. 2002-195116. In the first arrangement example, an engine and a rectangular-parallelepiped battery are installed in the engine compartment of the front end of a vehicle to be juxtaposed in the width direction of the vehicle. An air cleaner is placed in the engine compartment at the rear side of the battery in the longitudinal direction of the vehicle, and an intake duct is attached to the air cleaner to extend toward the front end of the vehicle around one side of the battery in the vehicle width direction, so that the opening of the air intake of the intake duct is directed ahead of the battery at the rear side of a headlight unit attached to the front end of the vehicle.

The second arrangement example is disclosed in Japanese Patent Application Publication No. H11-294297. In the second arrangement example, an engine and a rectangular-parallelepiped battery are installed in the engine compartment of a vehicle to be juxtaposed in the width direction of the vehicle. An air cleaner is placed in the engine compartment at the rear side of the battery in the longitudinal direction of the vehicle, and an intake duct, which introduces air into an air cleaner, extends in the longitudinal direction of the vehicle to cover the battery from above.

SUMMARY

However, in the first arrangement example, the opening of the air intake is directed in front of the vehicle at the rear side of the headlight unit attached to the front end of the vehicle. For this reason, the headlight unit may block low-temperature air from flowing into the air intake. This results in reduction in the amount of air introduced in the air cleaner, causing reduction in the engine capability. In addition, in the first arrangement example, because the intake duct extends in the longitudinal direction of the vehicle around one side of the battery in the vehicle width direction, the top of the battery is exposed in the engine compartment. Thus, if there were an accidental contact between a pedestrian and the front portion of a vehicle with the first arrangement example, the pedestrian could be easily contacted, via the engine hood, to the front edge or one front corner of the high-rigid top of the battery in the vehicle width direction; one front corner is located to be closer to the center of the vehicle than the other front corner is.

In the second arrangement example, the intake duct is merely disposed above the battery. For this reason, if the front end of the vehicle were subjected to external force, the external force could push the intake duct toward the rear side, resulting in exposure of the top of the battery in the engine compartment. In this case, as described above, if there were an accidental contact between a pedestrian and the front portion of a vehicle with the second arrangement example, the pedestrian could be easily contacted, via the engine hood, to the front edge of the top of the battery or one front corner of the top face of the battery in the vehicle width direction, located to be closer to the center of the vehicle than the other front corner is.

In the second arrangement example, because the opening of the air intake is directed in front of the vehicle, air containing foreign particles, such as snow particles, may be likely introduced via the air intake into the air cleaner. This may cause clogging of the air cleaner, resulting in reduction in the engine capability.

In view of the circumstances set forth above, one aspect of the present invention seeks to provide intake systems of a vehicle engine, which are designed to address the problems set forth above.

Specifically, an alternative aspect of the present invention aims to provide such intake systems, which could reduce: impact on a pedestrian if there were an accidental contact between the pedestrian and a corresponding vehicle; and reduce damage of the battery if the front end of the vehicle were subjected to external force. A further aspect of the present invention aims to provide such intake systems, which are capable of preventing foreign particles, such as snow particles, from being introduced into an air cleaner, thus maintaining the engine capability independently of these foreign particles.

According to an exemplary aspect of the present invention, there is provided an intake system installed in an engine compartment of a front portion of a vehicle in which an engine and a battery are arranged in a width direction of the vehicle. The intake system includes an air cleaner located at a rear side of the battery in a front-rear direction of the vehicle, and an intake duct located to extend from the air cleaner to the forward. The intake duct includes a horizontal portion having a front end and a rear end in the front-rear direction of the vehicle and located to extend in the front-rear direction of the vehicle to be opposite to a top face of the battery. The intake duct includes a vertical portion extending curvedly from the front end of the horizontal portion and extending downward in a height direction of the vehicle along a front face of the battery. The vertical portion is formed with an air intake at a bottom thereof in the height direction of the vehicle. The air intake is located at a front side of the battery in the front-rear direction of the vehicle to be higher in the height direction of the vehicle than a bottom edge of the front face of the battery. An opening of the air intake is directed downward in the height direction of the vehicle.

In the exemplary aspect of the present invention, the horizontal portion and the vertical portion are located to cover at least: an area of each of the top face and the front face of the battery, which is located at a center side of the engine compartment in the vehicle width direction; and an edge of each of the top face and the front face of the battery, which is located at the center side of the engine compartment in the vehicle width direction.

In the exemplary aspect of the present invention, the horizontal portion and the vertical portion are located to cover at least: an area of each of the top face and the front face of the battery, which is located at a center side of the engine compartment in the vehicle width direction; and an edge of each of the top face and the front face of the battery, which is located at the center side of the engine compartment in the vehicle width direction. The horizontal portion and the vertical portion are also formed to expand toward a center of the vehicle in the width direction of the vehicle to cover one front corner of the top face of the battery in the width direction of the vehicle. The one front corner is located to be closer to the center of the vehicle than the other front corner is.

In the exemplary aspect of the present invention, a radiator of the vehicle is disposed below an upper member of a frame of the vehicle via a space. The upper member is hanged on the vehicle in the width direction of the vehicle. The battery is located such that a part of the front face of the battery faces the space. The part of the front face is lower in the height direction of the vehicle than a top edge of the front face, and the air intake of the intake duct is arranged to be lower than a bottom edge of the upper member and higher than a top of the radiator corresponding to a bottom of the space in the height direction of the vehicle.

In the exemplary aspect of the present invention, a radiator of the vehicle is disposed below an upper member of a frame of the vehicle via a space. The upper member is hanged on the vehicle in the width direction of the vehicle. The battery is located such that a part of the front face of the battery faces the space. The part of the front face is lower in the height direction of the vehicle than a top edge of the front face. The air intake of the intake duct is arranged such that the air intake is lower than a bottom edge of the upper member and higher than a top of the radiator corresponding to a bottom of the space in the height direction of the vehicle. The air intake is located between the front face of the battery and a center portion of a space in the front-rear direction of the vehicle. The space is defined as a space between a rear face of the upper member and the front face of the battery in the front-rear direction of the vehicle.

The intake system according to the exemplary aspect of the present invention could protect a pedestrian and reduce the possibility of the battery being damaged even if there were an accidental contact between the pedestrian and a front portion of the vehicle. The intake system according to the exemplary aspect of the present invention removes foreign particles, such as snow particles from entering air to introduce the entering air, from which these foreign particles have been removed, only into the air cleaner. This improves the capability of the engine.

BRIEF DESCRIPTION OF THE DRAWINGS

Other aspects of the present invention will become apparent from the following description of embodiments with reference to the accompanying drawings in which.

DETAILED DESCRIPTION OF EMBODIMENT

Intake systems of a vehicle engine according to an embodiment of the present invention will be described hereinafter with reference to the accompanying drawings. The drawings are schematic drawings, and therefore the dimensions of one or more elements illustrated in one drawing need not be identical to those of them illustrated in another drawing. Similarly, the ratios between the dimensions of one or more elements illustrated in one drawing need not be identical to those between the dimensions of them illustrated in another drawing, and the shapes of one or more elements illustrated in one drawing need not be identical to those of them illustrated in another drawing. In this embodiment, the longitudinal direction, i.e. the front-rear direction, and the width direction, i.e. the left-right direction, of a corresponding vehicle are illustrated by respective arrows.

Figure 1:
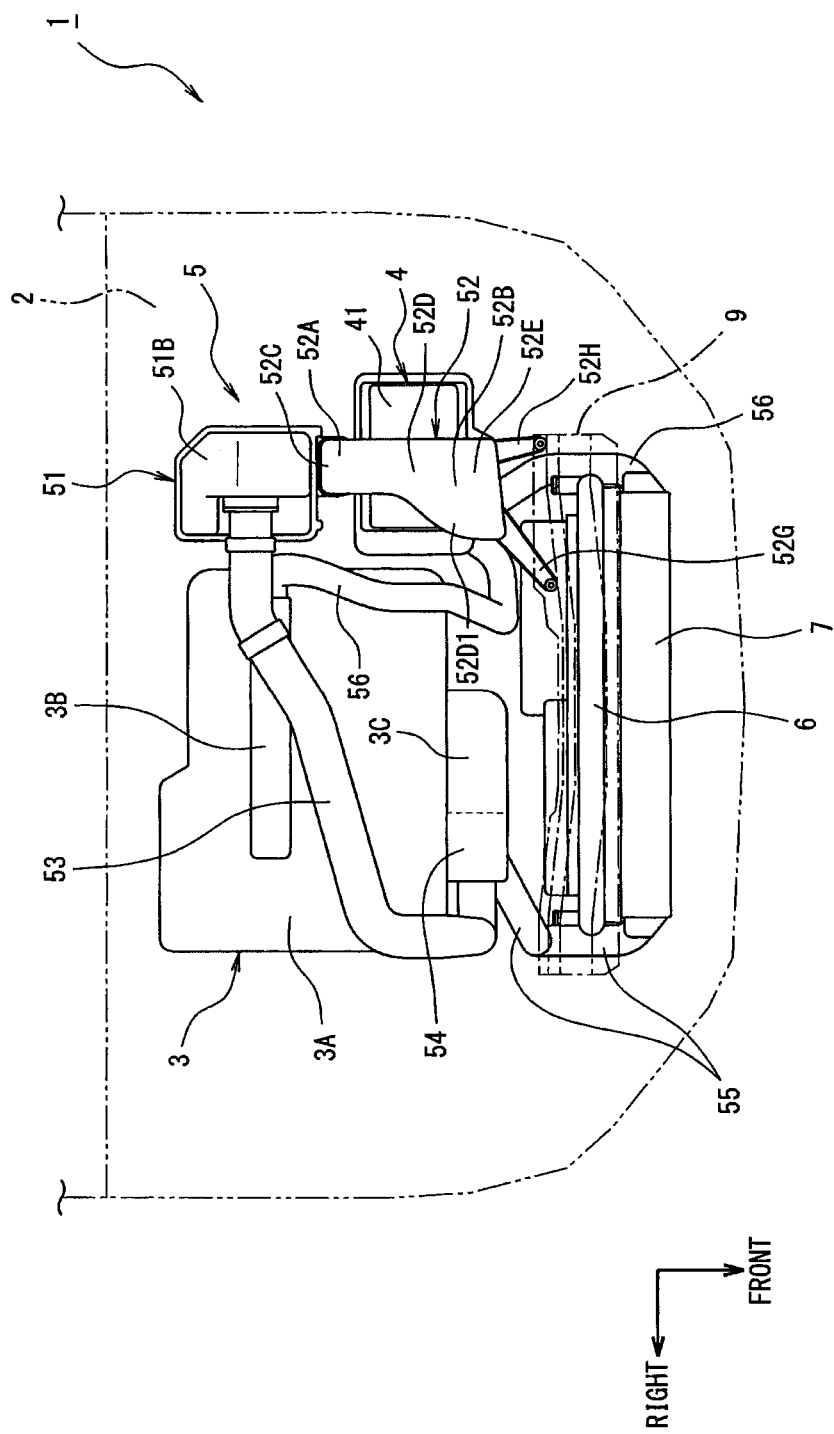
FIG. 1 is a top plan view of an example of the arrangement of an intake system in an engine compartment according to an embodiment of the present invention.
Figure 2:
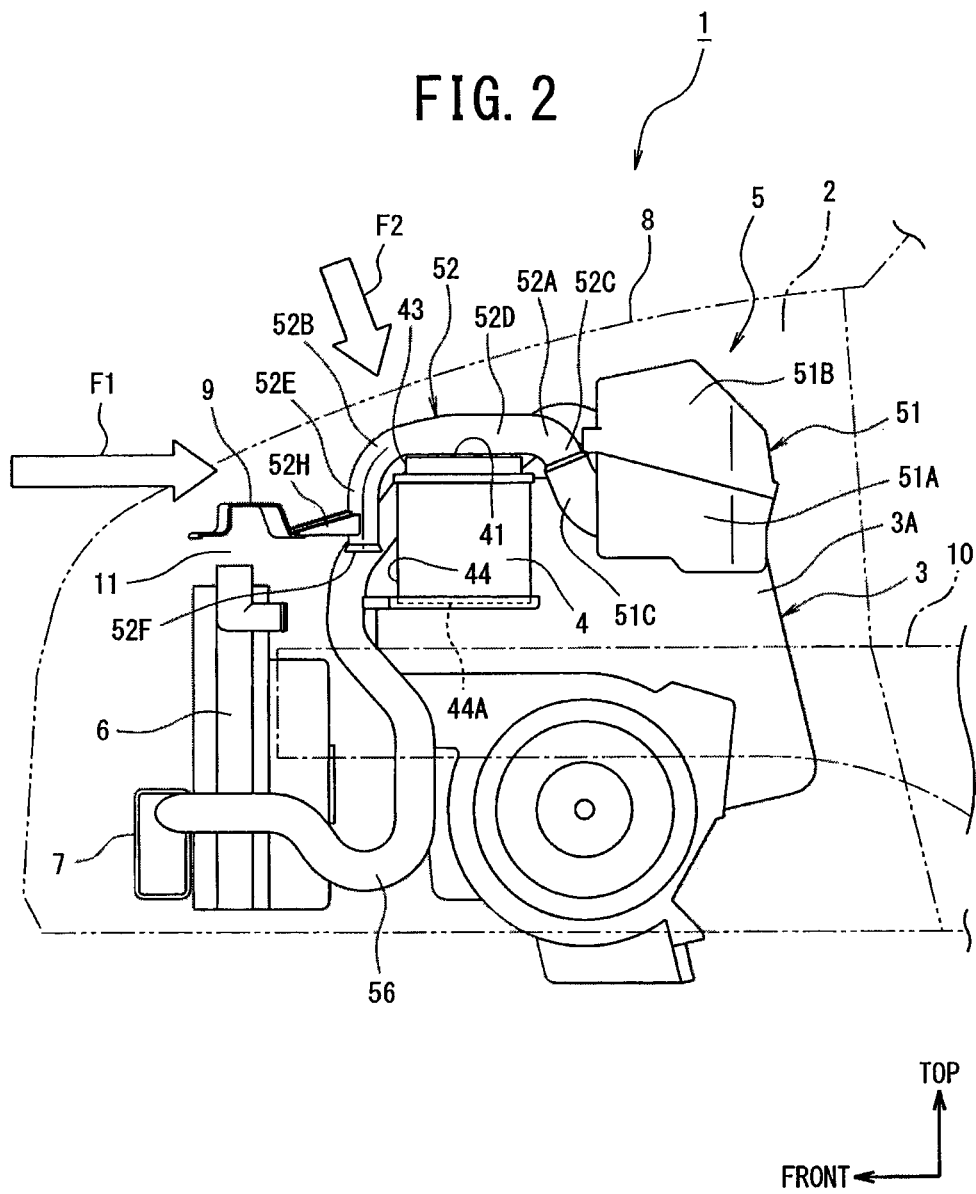
FIG. 2 is a side view of the arrangement of the intake system in the engine compartment.

Referring to FIGS. 1 and 2, the body of a vehicle 1 is provided at its front portion with an engine compartment 2. In the engine compartment 2, an engine 3, a battery 4, an intake system 5 including an intercooler 7, a radiator 6, and other objects, which are need to be located around the engine 3, are installed. Referring to FIG. 2, an engine hood 8 covers the top of the engine 3.

The engine 3 and the battery 4 are juxtaposed in the left-right direction in the engine compartment 2. The radiator 6 and the intercooler 7 are disposed inside a radiator grille (not shown) attached to the front end of the engine compartment 2.

In the front portion of the body of the vehicle 1, the front portion of a frame is provided. The front portion of the frame is made up of an upper member 9, a pair of side members 10, and a cross member (not shown). The upper member 9 is hanged on the top of the front end of the vehicle body to extend in the left-right direction, i.e. the vehicle width direction. The side members 10 are mounted on the respective left and right sides of the vehicle body to extend in the longitudinal direction of the vehicle 1 (see FIG. 2). The cross member is joined to each of the front ends of the side members 10 to extend in the left-right direction, i.e. the vehicle width direction.

Referring to FIG. 2, the engine hood 4 can be locked to the upper member 9. The radiator 6 is disposed below the upper member 9. That is, there is a space 11 between the top of the radiator 6, which is opposite to the bottom of the upper member 9, and the bottom of the upper member 9. The battery 4 has a substantially rectangular-parallelepiped shape, and is disposed such that at least part of its front face 44, directed in front of the vehicle 1, is opposite to the space 11; the part of the front face 44 is lower in the height direction of the vehicle 1 than a top edge of the front face 44.

Referring to FIG. 1, the engine 3 is comprised of a cylinder head 3A of a cylinder block, an intake manifold 3B communicating with each cylinder of the cylinder block, and an exhaust manifold 3C communicating with each cylinder of the cylinder block. The intake manifold 3B is located at the rear side of the cylinder head 3A, and the exhaust manifold 3C is located in front of the cylinder head 3A.

Referring to FIG. 1, the intake system 5 includes an air cleaner 51, an intake duct 52, an outlet pipe 53 for the air cleaner 51, a turbo supercharger 54, an inlet pipe 55 for the intercooler 7, the intercooler 7, and an outlet pipe 56 for the intercooler 7.

The air cleaner 51 is located at the rear side of the battery 4, and the intake duct 52 is communicably coupled to the air cleaner 51. The outlet pipe 53 is communicably coupled to the air cleaner 51. The turbo supercharger 54 is communicably coupled to the outlet pipe 53. The inlet pipe 55 has one end and the other end, the one end of the inlet pipe 55 is communicably coupled to the turbo supercharger 54, and the other end of the inlet pipe 55 is communicably coupled to the intercooler 7. The outlet pipe 56 has one end and the other end, the one end of the outlet pipe 56 is communicably coupled to the intercooler 7, and the other end of the outlet pipe 56 is communicably coupled to the intake manifold 3B.

Referring to FIG. 2, the air cleaner 51 is comprised of a body 51A, a cover 51B, an air-cleaner element, and a connection tube 51C. The body 51A has the shape of a rectangular-parallelepiped container with an opening top side, and located in the engine compartment 2 with the opening top side directed upward in the height direction of the vehicle 1. The cover 51B is mounted on the opening top side of the body 51A to cover it, thus providing an air-cleaner casing inside the combination of the body 51A and cover 51B. The air-cleaner element is installed in the air-cleaner casing, and adapted to filter impurities contained in air entering itself to clean the entering air. The connection tube 51C is communicably coupled to the front side of the body 51A to project therefrom upwardly for transferring entering air to the air-cleaner element.

In this embodiment, the intake duct 52 is made of synthetic resins. The intake duct 52 has given rigidity enough to hold tubular structure, and has a desired elasticity that allows, if being pressed, the deformed shape to return to its original shape.

Figure 5:
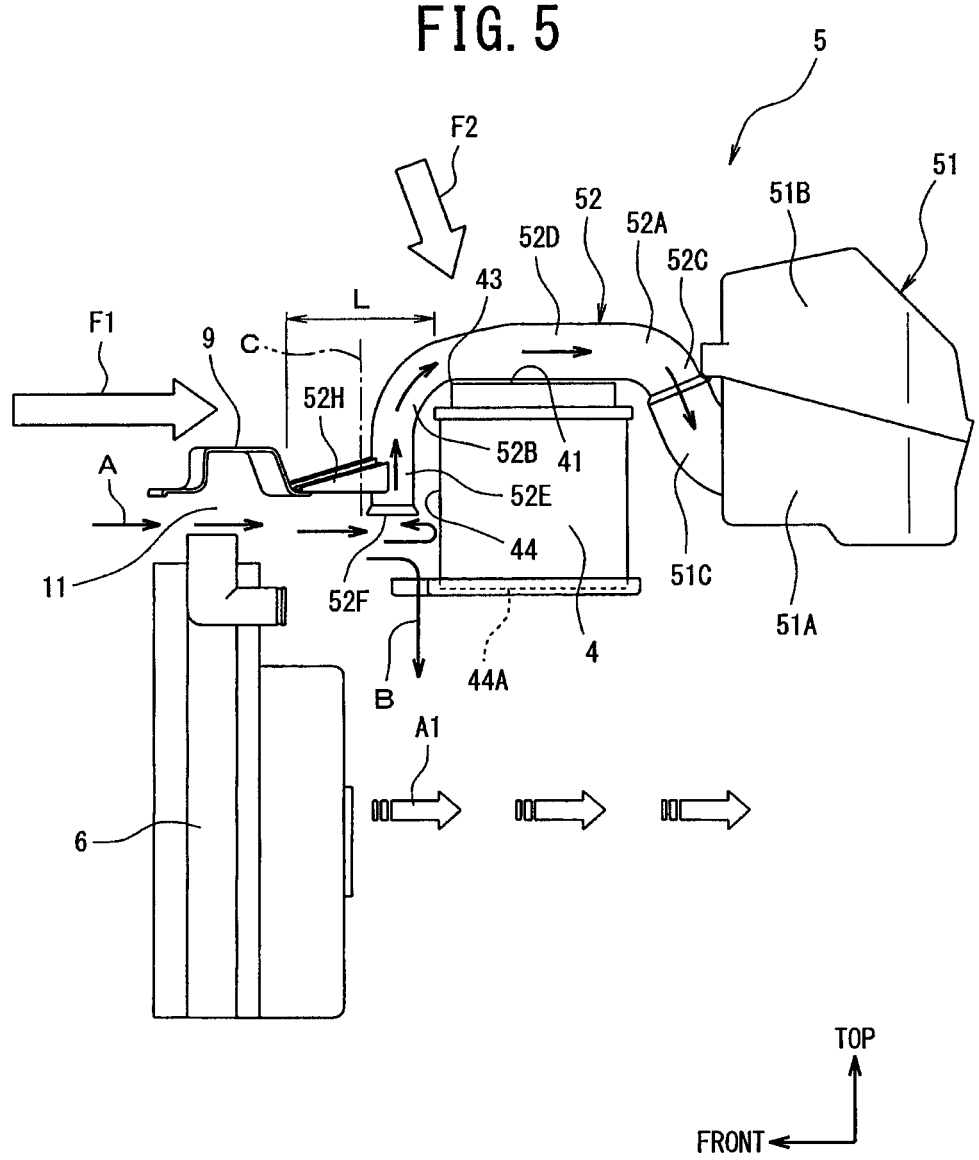
FIG. 5 is a side view of the intake system according to this embodiment.

Referring to FIGS. 2 and 5, the intake duct 52 according to this embodiment is formed to have a substantially L or U shape in a right-side or left-side view. Specifically, the intake duct 52 is comprised of a rear curved portion 52A, a front curved portion 52B, a connection tube 52C, a horizontal portion 52D, a vertical portion 52E, an air intake 52F, and a pair of brackets 52G and 52H. The vertical portion 52E can include the front curved portion 52B.

The horizontal portion 52D is located over the top of the battery 4 in the longitudinal direction of the vehicle 1. One end, i.e. a rear end, of the horizontal portion 52D is continuously joined to one end, i.e. a front end, of the rear curved portion 52A, and the other end, i.e. the rear end, of the rear curved portion 52A is curved downward relative to the horizontal portion 52D. One end of the connection tube 52C is continuously joined to the other end of the rear curved portion 52A.

The other end, i.e. front end, of the horizontal portion 52D is continuously joined to one end, i.e. a rear end, of the front curved portion 52B, and the other end, i.e. the front end, of the front curved portion 52B is curved downward relative to the horizontal portion 52D. One end, i.e. a top end, of the vertical portion 52E is continuously joined to the other end of the front curved portion 52B, and the other end, i.e., the lower end, of the vertical portion 52E extends downward in the height direction of the vehicle 1. The bottom of the lower end of the vertical portion 52E is opening, which serves as the air intake 52F. The opening of the air intake 52F is directed downward in the height direction of the vehicle 1. The brackets 52G and 52H are attached to both sides of the lower end of the vertical portion 52E to extend in front of the vertical portion 52E.

Referring to FIGS. 2 and 5, the connection tube 52C has a substantially cylindrical shape. The other end, i.e. a free end, of the connection tube 52C is communicably coupled to the connection tube 51C of the air cleaner 51. In order to facilitate the coupling of the connection tube 52C to the connection tube 51C, the connection tube 52C can be made of a material higher in flexibility than those of the other portions of the intake duct 52.

Figure 4:
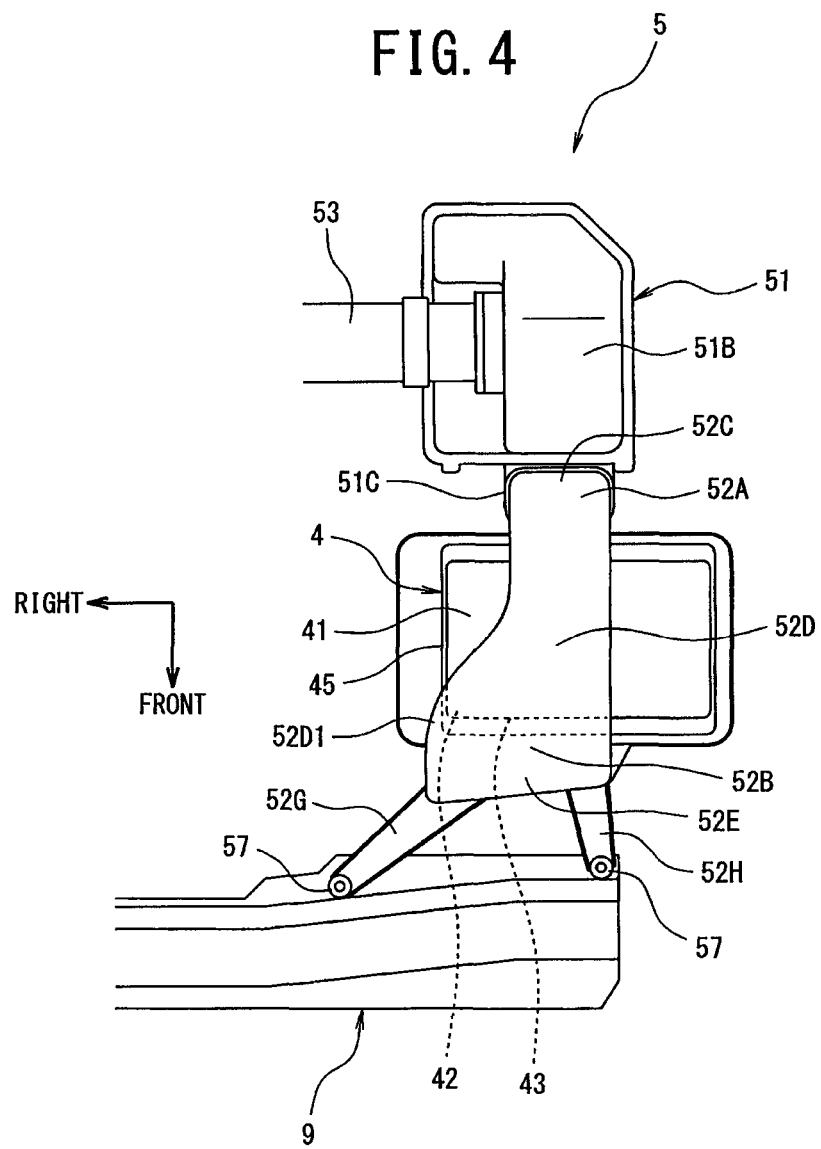
FIG. 4 is a plan view of a main part of the intake system according to this embodiment.

Referring to FIG. 4, the horizontal portion 52D of the intake duct 52 is formed as a flat hollow duct whose width is greater at the front-side end coupled to the front curved portion 52B than at the rear-side end coupled to the rear curved portion 52A. Specifically, the front-side half of the horizontal portion 52D in the longitudinal direction of the vehicle 1 is formed with an expansion portion 52D1 that expands toward the center of the vehicle 1, i.e. the right-side in this embodiment, in the vehicle width direction to cover one front corner 42 of the top face 41 of the battery 4 in the vehicle width direction, located to be closer to the center of the vehicle 1 than the other front corner is.

The horizontal portion 52D is also formed to cover a part, i.e. a right-side part, of the front edge 43 of the top face 41 of the battery 4; the part (right-side part) of the front edge 43 is located at the center side of the engine compartment 2 in the vehicle width direction. The horizontal portion 52D, which is a flat hollow duct, has given durability enough to withstand load applied thereto from above, and has repulsion and elasticity that would function as a shock absorber if there were an accidental contact between a pedestrian and the engine hood 8 of the vehicle 1.

Figure 3:
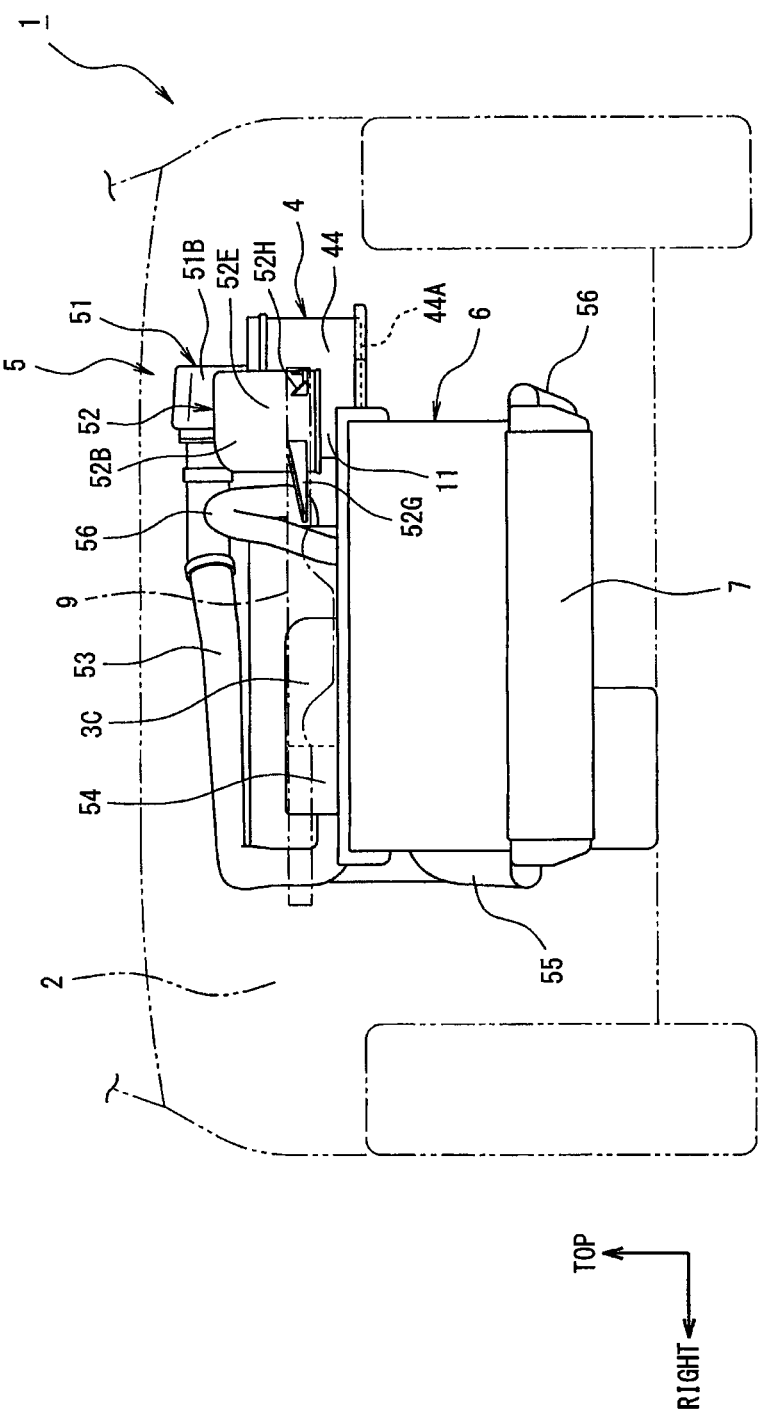
FIG. 3 is a front view of the arrangement of the intake system in the engine compartment.
Figure 6:
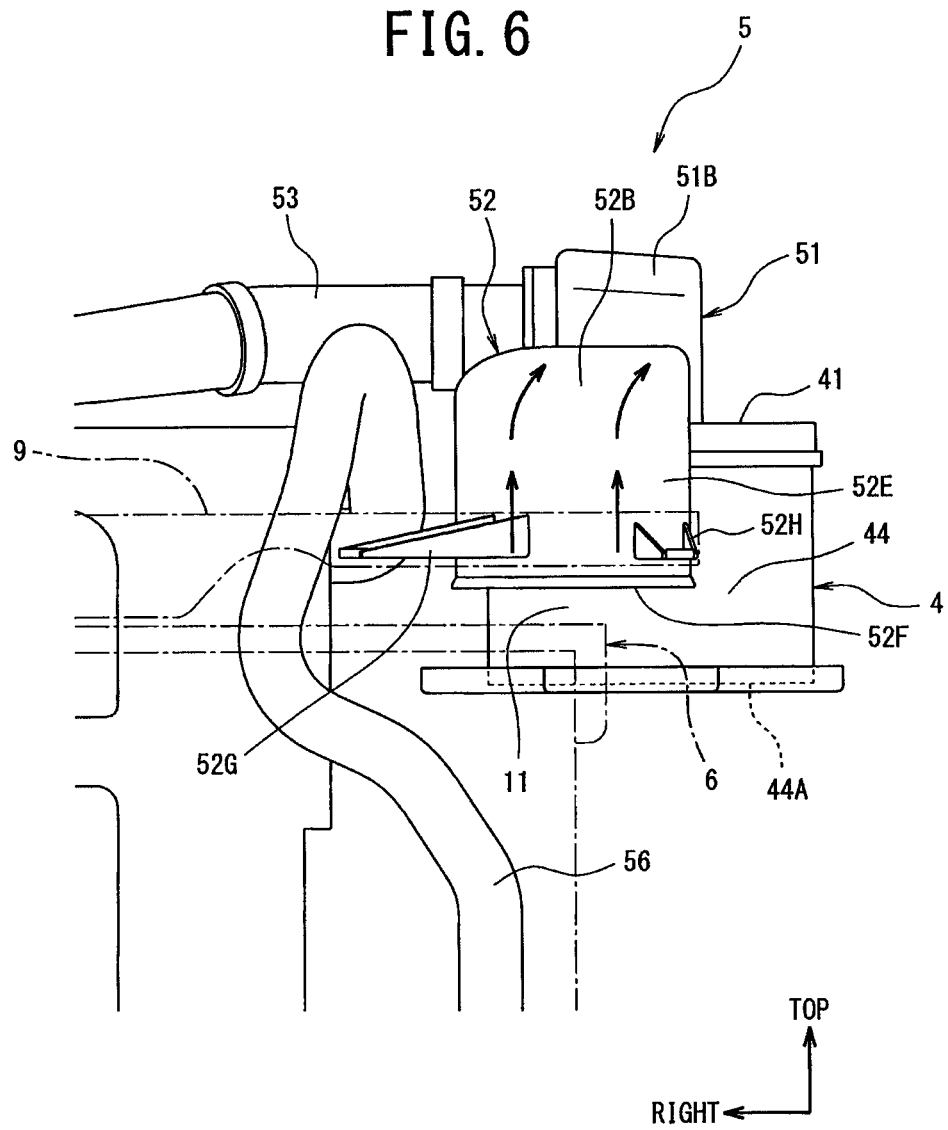
FIG. 6 is a front view of the intake system according to this embodiment.

Referring to FIGS. 3 and 6, the vertical portion 52E of the intake duct 52 has a width identical to the width of the front end of the horizontal portion 52D. The vertical portion 52E is arranged to be substantially orthogonal to the horizontal portion 52D via the front curved portion 52B. The vertical portion 52E is located to face at least an area, i.e. a right-side area, of the front face 44 of the battery 4; the area of the front face 44 is located at the center side of the engine compartment 2 in the vehicle width direction. Thus, the horizontal portion 52D, the front curved portion 52B, and the vertical portion 52E cover at least: an area of each of the top face 41 and the front face 44 of the battery 4, which is located at the center side of the engine compartment 2 in the vehicle width direction; and an edge of each of the top face 41 and the front face 44 of the battery 4, which is located at the center side of the engine compartment 2 in the vehicle width direction.

The vertical portion 52E, the front curved portion 52B, and the horizontal portion 52D are integrally formed. That is, each of the front curved portion 52B and the vertical portion 52D has given durability enough to withstand load applied thereto. For this reason, each of the vertical portion 52E, the front curved portion 52B, and the horizontal portion 52D has given rigidity enough to hold its shape. Thus, even if the front end of the vehicle 1 were subjected to external fore from its front side so that force based on the external force acted on the intake duct 52 to move it in the rear direction of the vehicle 1, the vertical portion 52E and the front curved portion 52B could be held to abut on the front face 44 of the battery 4. That is, the vertical portion 52E and the front curved portion 52B could serve as a portion caught on the battery 4.

As illustrated in FIGS. 2, 3, 5, and 6, the air intake 52F formed at the bottom of the lower end of the vertical portion 52E is located to be higher than the bottom edge 44A of the front face 44 of the battery 4. In addition, the air intake 52F is arranged to be lower than the bottom edge of the upper member 9 and higher than the top of the radiator 6 corresponding to the bottom of the space 11 in the height direction of the vehicle 1. Particularly, referring to FIG. 5, the air intake 52F is located between the front face 44 of the battery 4 and a center line (center) C. The center line C is defined to face the air intake 52F and to pass through half of a line L; the line L is defined between the front face 44 of the battery 4 and a rear face of the upper member 9 opposite to the front face 44 to pass through the center axis of the air intake 52F. Referring to FIG. 4, the lower end of the vertical portion 52E is fixed to the bottom of the rear face of the upper member 9 via the brackets 52G and 52H and bolts 57.

Next, the remaining members of the intake system 5 disposed downstream of the air clear 51 will be described. To the cover 51B of the air cleaner 51, one end of the outlet pipe 53 is communicably joined. The outlet pipe 53 extends via the upper side of the engine 3, so that the other end is communicably joined to an inlet port of the turbo supercharger 54 mounted on the right-side of the front of the engine 3. To an outlet port of the turbo supercharger 54, one end of the inlet pipe 55 for the intercooler 7 is communicably coupled. The other end of the inlet pipe 55 is communicably coupled to an inlet coupler (not shown) of the intercooler 7; the intercooler 7 is mounted on the lower side of the front of the radiator 6. To an outlet coupler (not shown) of the intercooler 7, the intake manifold 3B, located at the rear side of the top of the engine 3, is communicably coupled. Thus, air entering the air cleaner 51 via the intake duct 52 is cleaned by the air cleaner 51, and thereafter transferred via the elements 53 to 55 and 7 to the intake manifold 3B.

Next, operations and technical effects of the intake system 5 configured set forth above will be described hereinafter.

If there were an accidental contact between a pedestrian and the front end of the vehicle 1, the pedestrian would be contacted to the vehicle 1 from the front end to its rear side, so that external force would be transferred to the vehicle 1 toward its rear side in the front-rear direction as illustrated by arrow F1 in FIGS. 2 and 5. Thereafter, if the pedestrian moved from the front end to the engine hood 8, external force would be transferred from the top of the vehicle 1 to the bottom thereof as illustrated by arrow F2 in FIGS. 2 and 5. As described above, the battery 4 has a substantially rectangular-parallelepiped shape, and relatively high rigidity in comparison to other in-vehicle parts, and is disposed vertically in the engine compartment 2. Thus, if there were an accidental contact between a pedestrian and the front end of the vehicle 1, so that the pedestrian were contacted to the battery 4, impact on the pedestrian could be increased.

In addition, because the engine 3 and the battery 4 are arranged in the vehicle width direction in the engine compartment 2, the battery 4 is located to be offset to one side in the vehicle width direction. For example, in this embodiment, the battery 4 is located to be offset to the left side in the vehicle width direction (see FIGS. 1 and 3). Thus, if there were an accidental contact between a pedestrian and the front end of the vehicle 1, so that the pedestrian were contacted to intersections between the top face 41, the front face 44, and an inner side face 45 in the vehicle width direction (see FIG. 4) of the battery 4; the intersections include one front corner 42 of the top face 41 of the battery 4 in the vehicle width direction, located to be closer to the center of the vehicle 1 than the other front corner is. Because the intersections include edges, if the pedestrian were contacted to any edge in the intersections, impact on the pedestrian could be increased.

In order to address these circumstances, as illustrated in FIGS. 1 and 4, the intake system 5 is configured such that the intake duct 52 is comprised of: the horizontal portion 52D extending, from the air cleaner 51, over the top of the battery 4 toward the front side in the front-rear direction of the vehicle 1; the front curved portion 52B; and the vertical portion 52D extending from the front curved portion 52B downwardly along the front face 44 of the battery 4. If a pedestrian were contacted to the engine hood 8 so that external force were applied to the battery 4, the components 52D, 52B, and 52E serve as a cushion member that prevents the pedestrian from being contacted to the intersections of the battery 4 including edges via the engine hood 8. Thus, even if a pedestrian were contacted to a part of the engine hood 8, which is opposite to the battery 4, the horizontal portion 52D and the front curved portion 52B of the intake duct 52 could absorb impact based on the contact, thus protecting the pedestrian. In addition, the components 52D, 52B, and 52E of the battery 4 protect the battery 4 from external force applied from the upper side of the battery 4.

In the intake system 5 according to this embodiment, at least part of the air intake 52F is located to face the front face 44 of the battery 4 in the vehicle width direction, and the opening of the air intake 52F is directed downward (see FIG. 6). Thus, if air A containing foreign particles, such as snow particles, enters the engine compartment 2 via the space 11 during the vehicle 1 running as illustrated in FIG. 5, the arrangement of the air intake 52F causes the foreign particles B, such as snow particles, to hit the front face 44 of the battery 4, so that the foreign particles B fall. Thus, it is possible to prevent foreign particles, such as snow particles, from entering the air intake 52F, and to supply air, from which foreign particles, such as snow particles have been removed, to the air cleaner 51. This prevents clogging of the air-cleaner element of the air cleaner 51 due to foreign particles, such as snow particles, thus maintaining the engine capability independently of these foreign particles.

In addition, the arrangement of the air intake 52F causes entering air via the space 11 to hit the front face 44 of the battery 4, resulting in temporary retention or reduction in speed of the entering air via the space 11. Thus, it is possible to smoothly introduce only a large amount of low-temperature air into the air intake 52F. Moreover, the arrangement of the air intake 52F causes entering fresh air via the space 11 to hit the front face 44 of the battery 4, resulting in holding down the increase in temperature of the battery 4, thus improving the capability of the battery 4.

The opening of the air intake 52F is arranged between the bottom of the upper member 9 or the space 11 and the front face 44 of the battery 4 in the front-rear direction of the vehicle 1. The arrangement of the air intake 52F smoothly introduces low-temperature air passing through the space 11 between the upper member 9 and the radiator 6 into the air intake 52F, thus improving the engine capability. Particularly, the arrangement of the air intake 52F prevents air A1, which has passed through the radiator 6 to be heated, from being introduced from the air intake 52F into the intake duct 52 as illustrated in FIG. 5.

Referring to FIGS. 2 and 5, if external force F1 were applied to the battery 4 from the front side toward the rear side of the vehicle 1, the front curved portion 52B and the vertical portion 52E could abut on the front face 44 of the battery 4 to be caught on the battery 4. The front curved portion 52B and the vertical portion 52E, which serve as a portion to be caught on the battery 4, could prevent the intake duct 52 from moving, from the upper side of the battery 4, toward the rear side of the vehicle 1 even if external force F1 were applied to the battery 4. Thus, even if external force F1 were applied to the front portion of the vehicle 1 in front of the vehicle 1, the front curved portion 52B and the vertical portion 52E, which cover at least an area of each of the top face 41 and the front face 44 of the battery 4, which is located at the center side of the engine compartment 2 in the vehicle width direction, could reduce adverse affect of the external force F1 on the battery 4.

In addition, the air intake 52F is arranged, in the height direction of the vehicle 1, to be within the bottom of the upper member 9, disposed to be lower than the top of the battery 4, and the top of the radiator 6 corresponding to the bottom of the space 11, in other words, within the top of the space 11 and the top of the radiator 6 corresponding to the bottom of the space 11. This arrangement of the air intake 52F results in an extension of the bottom of the lower end of the vertical portion 52E, i.e. the air intake 52F, downward in the height direction of the vehicle 1 as long as the air intake 52F is prevented from being subjected to heated air having passed through the radiator 6.

Referring to FIG. 5, the air intake 52F is located to be closer to the front face 44 of the battery 4 other than to the center line C defined to pass through half of the line L; the line L is defined between the front face 44 of the battery 4 and the rear face of the upper member 9 opposite to the front face 44 to pass through the center axis of the air intake 52F. The location of the air intake 52F results in a reduction in the distance between the portion to be caught on the battery 4, which is comprised of the front curved portion 52B and the vertical portion 52E, and the front face 44 of the battery 4 in the front-rear direction of the vehicle 1. This results in the portion to be caught on the battery 4 being substantially orthogonal to the horizontal portion 52D. Thus, even if the front portion of the vehicle 1 were subjected to external force in front of the vehicle 1, the vertical portion 52E could be prevent from moving, by a large amount, in the rear direction of the vehicle 1 due to impact based on the external force, thus reliably covering at least the one front corner 42 of the top face 41 of the battery 4 in the vehicle width direction, and a part of the front edge 43 of the top face 41 of the battery 4, which is located at the center sided of the engine compartment 2 in the vehicle width direction.

The intake system 5 according to this embodiment of the present invention has been described, but the descriptions and figures of which are not limited to the present invention. Skilled persons in the art could derive, from the descriptions and figures of the intake system 5 according to this embodiment, various alternative embodiments, other embodiments, and operational techniques.

For example, the intake system 5 according to this embodiment is comprised of the turn supercharger 54 and/or the intercooler 7, but the turn supercharger 54 and/or the intercooler 7 can be eliminated from the intake system 5.

In this embodiment, the horizontal portion 52D, the front curved portion 52B, and the vertical portion 52E of the intake duct 52 is formed as a flat hollow duct, but the present invention is not limited thereto. Specifically, the inner duct 52 can be provided at its inner wall with ribs for enhancing elasticity and rigidity. In addition, the inner hollow space of each of the front curved portion 52B, and the vertical portion 52E of the intake duct 52 can be divided by partitions into a plurality of spaces in the vehicle width direction; each of the plurality of spaces extends in the direction of the length of a corresponding one of the front curved portion 52B, and the vertical portion 52E of the intake duct 52.

While an illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An intake system installed in an engine compartment of a front portion of a vehicle in which an engine and a battery are arranged in a width direction of the vehicle, the intake system comprising:
   an air cleaner located at a rear side of the battery in a front-rear direction of the vehicle; and
   an intake duct located to extend from the air cleaner to the forward,
   the intake duct comprising:
   a horizontal portion having a front end and a rear end in the front-rear direction of the vehicle and located to extend in the front-rear direction of the vehicle to be opposite to a top face of the battery; and
   a vertical portion extending curvedly from the front end of the horizontal portion and extending downward in a height direction of the vehicle along a front face of the battery,
   the vertical portion being formed with an air intake at a bottom thereof in the height direction of the vehicle, the air intake being located at a front side of the battery in the front-rear direction of the vehicle to be higher in the height direction of the vehicle than a bottom edge of the front face of the battery, an opening of the air intake being directed downward in the height direction of the vehicle.

2. The intake system according to claim 1, wherein the horizontal portion and the vertical portion are located to cover at least: an area of each of the top face and the front face of the battery, which is located at a center side of the engine compartment in the vehicle width direction; and an edge of each of the top face and the front face of the battery, which is located at the center side of the engine compartment in the vehicle width direction.

3. The intake system according to claim 1, wherein the horizontal portion and the vertical portion are:
   located to cover at least: an area of each of the top face and the front face of the battery, which is located at a center side of the engine compartment in the vehicle width direction; and an edge of each of the top face and the front face of the battery, which is located at the center side of the engine compartment in the vehicle width direction; and
   formed to expand toward a center of the vehicle in the width direction of the vehicle to cover one front corner of the top face of the battery in the width direction of the vehicle, the one front corner being located to be closer to the center of the vehicle than the other front corner is.

4. The intake system according to claim 1, wherein a radiator of the vehicle is disposed below an upper member of a frame of the vehicle via a space, the upper member being hanged on the vehicle in the width direction of the vehicle, the battery is located such that a part of the front face of the battery, which is lower in the height direction of the vehicle than a top edge of the front face, faces the space, and the air intake of the intake duct is arranged to be lower than a bottom edge of the upper member and higher than a top of the radiator corresponding to a bottom of the space in the height direction of the vehicle.

5. The intake system according to claim 1, wherein a radiator of the vehicle is disposed below an upper member of a frame of the vehicle via a space, the upper member being hanged on the vehicle in the width direction of the vehicle, the battery is located such that a part of the front face of the battery faces the space, the part of the front face being lower in the height direction of the vehicle than a top edge of the front face, and the air intake of the intake duct is arranged such that the air intake is lower than a bottom edge of the upper member and higher than a top of the radiator corresponding to a bottom of the space in the height direction of the vehicle, and the air intake is located between the front face of the battery and a center portion of a space in the front-rear direction of the vehicle, the space being defined as a space between a rear face of the upper member and the front face of the battery in the front-rear direction of the vehicle.

* * * * *